US011106912B1

(12) United States Patent
Zankl

(10) Patent No.: US 11,106,912 B1
(45) Date of Patent: Aug. 31, 2021

(54) METHOD AND SYSTEM FOR VIDEO CONTENT ANALYSIS

(71) Applicant: GENETEC INC., Saint-Laurent (CA)

(72) Inventor: Georg Zankl, Vienna (AT)

(73) Assignee: GENETEC INC., St-Laurent (CA)

( * ) Notice: Subject to any disclaimer, the term of this patent is extended or adjusted under 35 U.S.C. 154(b) by 65 days.

(21) Appl. No.: 16/531,963

(22) Filed: Aug. 5, 2019

(51) Int. Cl.
*G06K 9/00* (2006.01)
*G06T 7/246* (2017.01)
*G06F 16/583* (2019.01)
*G06T 7/215* (2017.01)

(52) U.S. Cl.
CPC ....... *G06K 9/00664* (2013.01); *G06F 16/583* (2019.01); *G06K 9/00711* (2013.01); *G06T 7/215* (2017.01); *G06T 7/246* (2017.01)

(58) Field of Classification Search
CPC ............ G06K 9/00664; G06K 9/00711; G06F 16/583; G06T 7/246; G06T 7/215
See application file for complete search history.

(56) References Cited

U.S. PATENT DOCUMENTS

| 7,696,903 | B2 | 4/2010 | Stam et al. |
| 7,830,243 | B2 | 11/2010 | Buckley et al. |
| 8,548,202 | B2 | 10/2013 | Nishino et al. |
| 8,854,469 | B2 | 10/2014 | Hörbinger et al. |
| 10,089,879 | B2 | 10/2018 | Ignaczak et al. |
| 10,142,545 | B2 | 11/2018 | Abe |
| 2008/0252723 | A1* | 10/2008 | Park ................ G06T 7/536 348/143 |
| 2011/0205077 | A1 | 8/2011 | Cavallaro et al. |
| 2012/0224635 | A1 | 9/2012 | Kim et al. |
| 2015/0302239 | A1* | 10/2015 | Ohba ............... G06K 9/00261 382/154 |
| 2018/0275410 | A1 | 9/2018 | Yeoh et al. |
| 2019/0043167 | A1 | 2/2019 | Steyskal et al. |

FOREIGN PATENT DOCUMENTS

| GB | 2447246 B | 4/2012 |
| WO | WO/2011/021914 A2 | 2/2011 |
| WO | WO/2018/193123 A1 | 10/2018 |

OTHER PUBLICATIONS

Feature Pyramid Networks for Object Detection (Tsung-Yi Lin1,2,) et al. (Year: 2017).*

(Continued)

*Primary Examiner* — Edward F Urban
*Assistant Examiner* — Wassim Mahrouka
(74) *Attorney, Agent, or Firm* — Norton Rose Fulbright Canada

(57) ABSTRACT

Computer-implemented systems and methods for video content analysis are described herein. A video feed comprising at least one image captured by a camera is received. The at least one image has a plurality of regions associated with a different level of precision required for each region. An adjustable image processing algorithm is applied to each region of the at least one image to obtain for each region the different level of precision. The image processing algorithm is adjusted based of the different level of precision associated with each region. Meta data indicative of content of the video feed is generating by the image processing algorithm.

25 Claims, 11 Drawing Sheets

(56) References Cited

OTHER PUBLICATIONS

Two-Frame Motion Estimation Based on Polynomial Expansion (Gunnar Farneback) (Year: 2001).*

Neugebauer, Peter J., and Konrad Klein. "Adaptive triangulation of objects reconstructed from multiple range images." IEEE Visualization'97, Late Breaking Hot Topics(1997): 20-24.

Menze, Moritz, et. al. "Object Scene Flow." ISPRS Journal of Photogrammetry and Remote Sensing. 2018.

Farnebäack, Gunnar. "Two-frame motion estimation based on polynomial expansion." Scandinavian conference on Image analysis. 2003.

Lucas, Bruce D. and Kanade, Takeo. "An Iterative Image Registration Technique with an Application to Stereo Vision." Proceedings of Imaging Understanding Workshop. 1981.

Tao, Michael W. et al. "SimpleFlow: A Non-iterative, Sublinear Optical Flow Algorithm." Computer Graphics Forum 31. 2012.

Kroeger, Till, et. al. "Fast optical flow using dense inverse search." Proceedings of the European Conference on Computer Vision. 2016.

Lin, Tsung-Yi, et al. "Feature pyramid networks for object detection." Proceedings of the IEEE Conference on Computer Vision and Pattern Recognition. 2017.

* cited by examiner

METHOD AND SYSTEM FOR VIDEO CONTENT ANALYSIS

TECHNICAL FIELD

The present disclosure relates generally to video processing, and, more particularly, to computer-implemented methods and systems for video content analysis.

BACKGROUND OF THE ART

Video content analysis (or video content analytics) generally refers to computer-implemented processes for analyzing a video feed to derive useful information about the content of the video feed. The derived useful information may indicate various temporal and/or spatial events in the video feed depending on the type of application. Video content analysis has a broad spectrum of applications, such as people counting, object detection, object identification, facial recognition, automatic plate number recognition, and many others.

Optical flow is a type of algorithm used in object detection applications and which typically returns one or more vector maps comprising motion vectors indicative of movement between a current frame and a previous frame of a video feed. Optical flow algorithms may be used to detect motion of an object between two consecutive frames caused by the movement of the object when the camera is static (i.e., not moving). Object size and movement distance in the image space depend on the physical distance of the object from the camera. In order to detect objects at a wide variety of physical distances from the camera, the optical flow detection is typically sensitive enough for large distances, but also robust enough so that camera noise does not induce motion vectors that do no correlate to actual events in the scene that the camera is capturing.

Various optical flow algorithms exists. However, optical flow algorithms are typically computationally complex, requires fast hardware and software solutions to implement and/or are slow at high resolution. Other applications of video content analysis may have similar deficiencies.

As such, there is a need for improved computer-implemented systems and methods for video content analysis.

SUMMARY

The present disclosure is generally drawn to systems, methods and computer-readable media for video content analysis, which may use knowledge of a scene that a video camera is capturing to adjust the precision of the processing of the video feed captured by the camera. The knowledge of the scene that is captured may comprise scene information indicative of which objects in the scene are closer to a camera and which objects in the scene are further away from the camera. If a moving object in the scene is closer to a static camera relative to another moving object further away from the camera, there is generally greater movement of the closer object between consecutive images of the video feed than the object further away from the camera. Consequently, for optical flow algorithms, less precision may be required for detecting movement of objects closer to the camera. If less precession is required, valuable computational time may be saved. Accordingly, the images of the video feed may be divided into different areas depending on how close and how far away objects in each area is expected to be from the camera. When detecting optical flows, the optical flow algorithm may process areas of the images corresponding to closer objects more coarsely and may process areas of the images corresponding to further away objects more precisely. In other words, areas of the images may be processed according to different degrees of precision depending on the corresponding distances of the areas (or distances of objects expected in the areas) from the camera. The aforementioned approach may be applicable to various video content analysis applications.

In one aspect, there is provided a computer-implemented method for video content analysis. The method comprises: receiving a video feed comprising at least one image captured by a camera, the at least one image having a plurality of regions associated with a different level of precision required for each region; applying an adjustable image processing algorithm to each region of the at least one image to obtain for each region the different level of precision, the image processing algorithm being adjusted based of the different level of precision associated with each region; and generating, by the image processing algorithm, meta data indicative of content of the video feed.

In another aspect, there is provided a system for video content analysis. The system comprises at least one processing unit and a non-transitory computer-readable memory having stored thereon program instructions executable by the at least one processing unit for: receiving a video feed comprising at least one image captured by a camera, the at least one image having a plurality of regions associated with a different level of precision required for each region; applying an adjustable image processing algorithm to each region of the at least one image to obtain for each region the different level of precision, the image processing algorithm being adjusted based of the different level of precision associated with each region; and generating, by the image processing algorithm, meta data indicative of content of the video feed.

In yet another aspect, there is provided a computer readable medium having stored thereon program code executable by a processor for video content analysis, the program code comprising instructions for: receiving a video feed comprising at least one image captured by a camera, the at least one image having a plurality of regions associated with a different level of precision required for each region; applying an adjustable image processing algorithm to each region of the at least one image to obtain for each region the different level of precision, the image processing algorithm being adjusted based of the different level of precision associated with each region; and generating, by the image processing algorithm, meta data indicative of content of the video feed.

In some embodiments, applying the image processing algorithm comprises iteratively repeating the image processing algorithm until the different level of precision for each region is obtained, where each iteration is adjusted based of the different level of precision associated with each region.

In some embodiments, a representation of the at least one image is obtained. In some embodiments, applying the image processing algorithm comprises performing a plurality of processing steps on the representation to obtain for each region the different level of precision, where each processing step is adjusted based of the different level of precision associated with each region.

In some embodiments, each processing step of the plurality of processing steps comprises processing a selected area of the representation corresponding to one or more of the regions. In some embodiments, adjusting each processing step comprises reducing the selected area for processing by removing at least one of the regions from the selected area and increasing a corresponding level of precision for processing.

In some embodiments, the representation is an image pyramid having a plurality of pyramid levels. In some embodiments, adjusting each processing step comprises selecting a level of the image pyramid for processing.

In some embodiments, the different level of precision associated with each region depends on a corresponding distance of one or more objects in each region from the camera.

In some embodiments, scene information indicative of the corresponding distance of one or more objects in each region from the camera is obtained. In some embodiments, the regions and the different level of precision for each region are determined based on the scene information.

In some embodiments, the adjustable image processing algorithm is an optical flow algorithm. In some embodiments, the meta data comprises data indicative of detected motion of at least one object in the video feed.

In some embodiments, one or more vector maps for each one of the regions are generating by the image processing algorithm. In some embodiments, the meta data is generated based on the vector maps.

In some embodiments, applying the image processing algorithm comprises iteratively processing a representation of the at least one image, where each iteration comprises: reducing a selected area of the representation for processing and increasing a corresponding level of precision for processing the selected area, the selected area corresponding to one or more of the regions; determining a first set of polynomial expansion coefficients of the representation based on the selected area; obtaining a second set of polynomial expansion coefficients corresponding to a previous image of the video feed preceding the at least one image; and generating a vector map based on the first and second set of polynomial expansion coefficients.

In some embodiments, generating the vector map further comprises generating the vector map based on a previous vector map determined for the previous image for the selected area.

In some embodiments, generating the vector map further comprises generating an upscaled vector map based on the vector map generated based on the first and second set of polynomial expansion coefficients.

In some embodiments, generating the vector map further comprises generating the vector map based on the first and second set of polynomial expansion coefficients and the upscaled vector map from a previous iteration.

Any of the above features may be used together in any suitable combination.

DESCRIPTION OF THE DRAWINGS

Reference is now made to the accompanying figures, in which.

It will be noted that throughout the appended drawings, like features are identified by like reference numerals.

DETAILED DESCRIPTION

Figure 1:
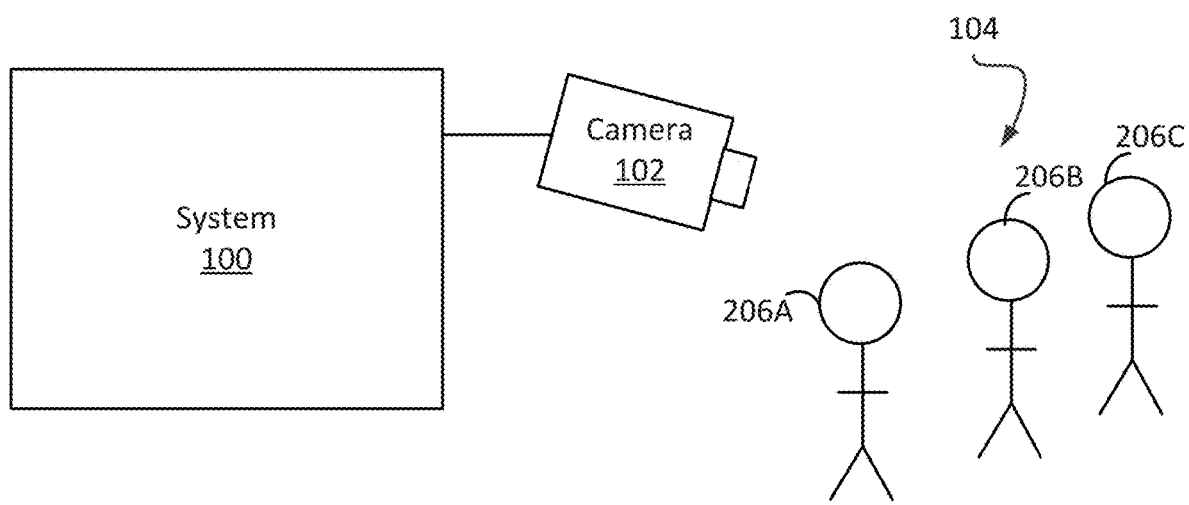
FIG. 1 is a schematic diagram of an example video content analysis system, in accordance with one or more embodiments.

With reference to FIG. 1, there is illustrated a video content analysis system 100 implemented by at least one computing device. The computing device may be any suitable computer, such as a desktop computer, a laptop computer, a mainframe, a server, a distributed computing system, a portable computing device, and the like. The system 100 is configured to receive one or more video feeds from one or more external sources. In the illustrated embodiment, the system 100 receives a video feed from a camera 102 that is in electronic communication with the system 100. The video feed may be received from any suitable camera comprising an optical sensor or from any suitable external database or storage device storing the video feed. The camera 102 may be a closed-circuit television (CCTV) camera or any suitable camera for obtaining a live video feed (e.g., security video footage). A live video feed refers to a video feed received in real-time or near real time. The camera 102 may be a static (i.e., non-moving) camera that captures a physical scene in scene space 104 with various moving and/or non-moving objects 206A, 206B, 206C. While the objects 206A, 206B, 206C in the scene space 104 are people, this is for example purposes only and the scene space 104 and/or the objects 206A, 206B, 206C would vary depending on practical implementations. The system 100 processes the video feed to derive information (also referred to as "meta data") about the content of the video feed. For example, the system 100 may detect one or more objects 206A, 206B, 206C and/or motion of one or more objects 206A, 206B, 206C in the scene space 104 being monitored.

Figure 2:
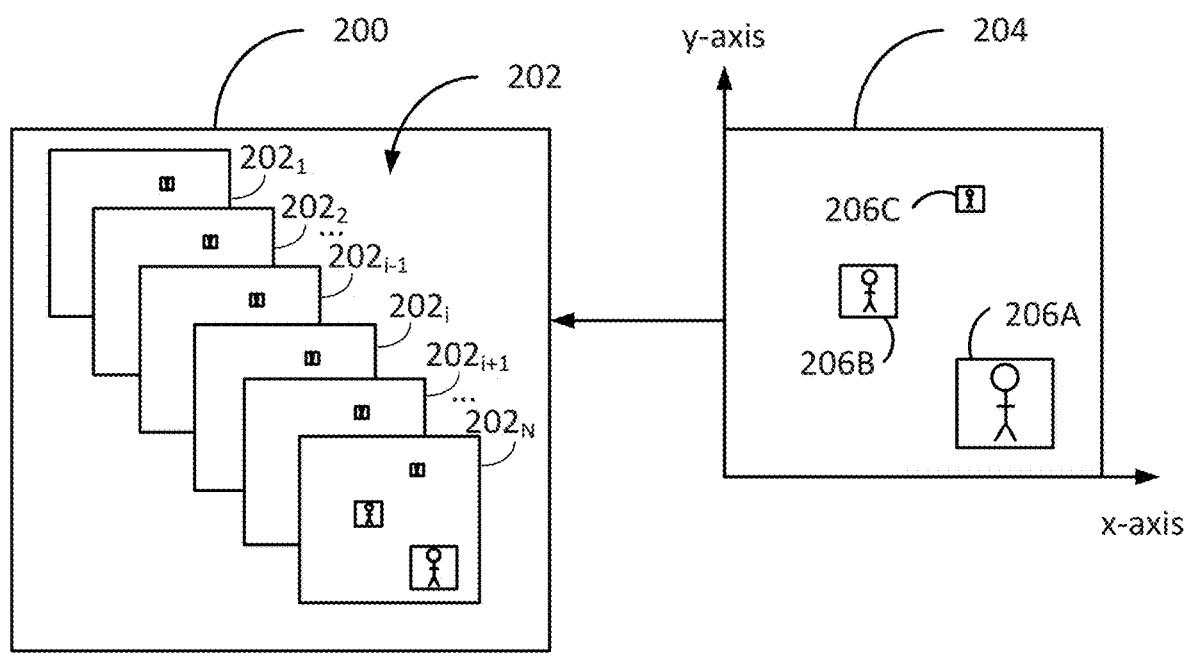
FIG. 2 is a diagram of a video feed and an image space associated with at least one image of the video feed, in accordance with one or more embodiments.

With additional reference to FIG. 2, an example of a video feed 200. In this illustrative embodiment, the video feed 200 comprises a plurality of images $202_1, 202_2, \ldots 202_{i-1}, 202_i, 202_{i+1}, \ldots 202_N$ (collectively 202). A given one of the images 202 of the video feed 200 may be referred to as a "video frame" or simply as a "frame". Each one of the images 202 is associated with an image space 204. The term "image space" refers to a corresponding space of a physical scene (e.g., the scene space 104) being captured on an image plane. When the camera 102 is static (i.e., not moving), the video feed 200 recorded would have the same scene space 104. When the camera 102 is non-static, the video feed 200 recorded may have a varying scene space 104. In the illustrated embodiment, first, second and third objects 206A, 206B, 206O are present in the scene space 104 being captured and are thus illustrated as being present in the image space 204. The distance from the camera 102 to the objects 206A, 206B, 206O varies, as some objects are closer to the camera 102 and other objects are further away from the camera 102. Assuming that the camera 102 is static and positioned to have the horizon of the scene space 104 parallel to the x-axis of the image space 204, an object down near the bottom of the y-axis of the image space 204 would be closer to the camera 102 relative to the same object near the top of the y-axis of the image space 204.

Figure 3:
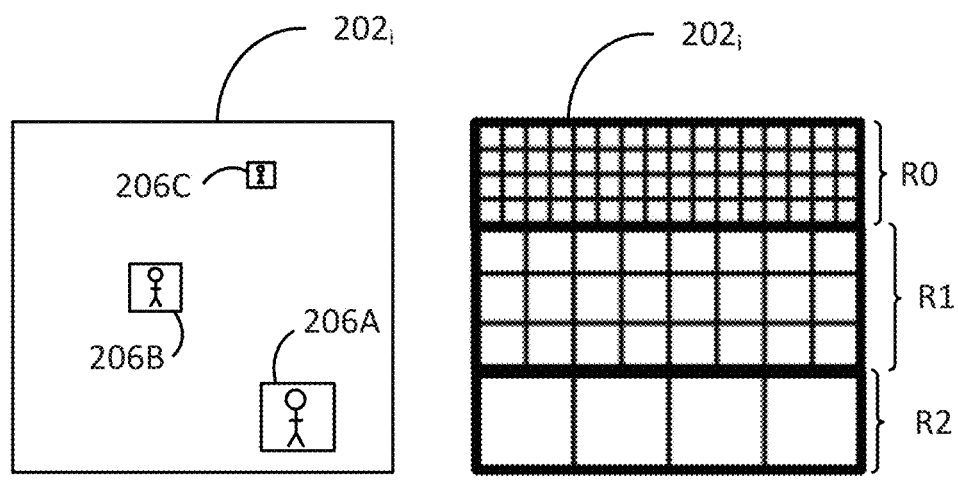
FIG. 3 is a diagram of an image of the video feed of FIG. 2 and a plurality of regions associated with the same image of the video feed, in accordance with one or more embodiments.

FIG. 3 illustrates a given image $202_i$ of the video feed 200 and shows the objects 206A, 206B, 206O are at various distances from the camera 102. In this example, the first object 206A is closest to the camera 102, the third object 206O is furthest away from the camera 102, and the second object 206B is between the first and third objects 206A, 206O. As is also shown in FIG. 3, the same image $202_i$ is associated with a plurality of regions R0, R1, R2. In some embodiments, the regions R0, R1, R2 are non-overlapping. In alternative embodiments, some overlap of the regions R0, R1, R2 is possible. Each region R0, R1, R2 is associated with a level of precision required for each region R0, R1, R2. The level of precision required of each region R0, R1, R2 corresponds to the precision of the processing to be performed on each region R0, R1, R2 by an image processing algorithm. The system 100 may associated the image $202_i$ with the regions R0, R1, R2 based on scene information of the scene space 104. The scene information may indicate the distances of one or more objects from the camera 102 at various locations of the image space 204. The scene information may be used to determine the regions R0, R1, R2 and/or a level of precision required of each region R0, R1, R2. The scene information may indicate the regions R0, R1, R2 in the image $202_i$ and/or the level of precision required of each region R0, R1, R2. In this example, the level of precision required for each region depends on a corresponding distance of one or more objects in each region R0, R1, R2 from the camera 102. As illustrated, region R0 has the highest level of precision as it corresponds to an area having objects furthest away from the camera 102, region R2 has the lowest level of precision as it corresponds to an area having objects closest to the camera 102, and region R1 has a level of precision between that of the other regions R2, R0, The system 100 can then process the image $202_i$ to obtain the different levels of precision for the different regions R0, R1, R2 of the image $202_i$. While three (3) regions R0, R1, R2 are illustrated, the number of regions may be more or less than three (3) depending on the scene information and/or practical implementations. In some embodiments, the image $202_i$ may have areas or regions in which analysis or processing is not performed. For instance, an area where no monitoring is needed (e.g., an area corresponding to sky or an area corresponding to a wall) may not have a region R0, R1, R2 associated therewith. In some embodiments, the number of regions is not finite and the processing of the image $202_i$ may be a function of location in the scene space 104 or the image space 204 (e.g., a distance from the bottom of the image space 204 or a distance from a pre-set horizontal line in the image space 204). For example, different levels of precision required for the image $202_i$ may be a function of location in the image space 204.

The system 100 processes the image $202_i$ differently according to the different levels of precision required for the image $202_i$. The system 100 may processes the image $202_i$ differently according to the different regions R0, R1, R2. The system 100 may implement an adjustable image processing algorithm. The same adjustable image processing algorithm may be used. For example, the same adjustable image processing algorithm may be applied to each region R0, R1, R2 of the image $202_i$ to obtain for each region R0, R1, R2 the different level of precision required of each region R0, R1, R2. Accordingly, the image processing algorithm may be adjusted based on the different level of precision associated with each region R0, R1, R2 in order to obtain the different level of precision required of each region R0, R1, R2. For example, the image processing algorithm may be configured to receive an input parameter indicative of the level of precision of the processing to be performed by the algorithm. Accordingly, more or less precise versions of the same algorithm may be used on different regions R0, R1, R2 of the image $202_i$. The algorithm accordingly processes the regions R0, R1, R2 and generates meta data indicative of the content of the video feed 200 based on the processing of the regions R0, R1, R2. In some embodiments, the system 100 may use different image processing algorithms (e.g., applied to the different regions R0, R1, R2 to obtain for each region R0, R1, R2 the different levels of precision).

In some embodiments, the adjustable image processing algorithm is an optical flow algorithm to detect movement of an object between two images $202_i$, $202_{i-1}$ of the video feed 200. An object 206A closer to the camera 102 may have greater movement between the images $202_i$, $202_{i-1}$ than an object 206O further away from the camera 102 given a same amount of movement in the scene space 104. Consequently, for detecting movement of an object between two images $202_i$, $202_{i-1}$, less precision may be required for detecting movement of the closer object 206A than the further away object 206C. Accordingly, the images $202_i$, $202_{i-1}$ of the video feed 200 may be divided into the different regions R0, R1, R2 depending on how close and how far away objects in each region R0, R1, R2 are expected to be from the camera 102. The optical flow algorithm may process a region R2 of the images $202_i$, $202_{i-1}$ corresponding to closer objects more coarsely (i.e., with a lower level of precision) and may process a region R0 of the images $202_i$, $202_{i-1}$ corresponding to further away objects more precisely (i.e., with a higher level of precision). Accordingly, the regions R0, R1, R2 of the images $202_i$, $202_{i-1}$ may be processed according to different levels of precision depending on the corresponding distances of the regions R0, R1, R2 (or distances of objects expected in the regions R0, R1, R2) from the camera 102.

The optical flow algorithm may generate one or more vector maps indicative of motion between two images $202_i$, $202_{i-1}$ of the video feed 200 (e.g., a current image and a previous image). Each vector map may comprise a plurality of motion vectors. Each motion vector may correspond to a two-dimensional vector that indicates motion between the same pixel of two images $202_i$, $202_{i-1}$ or the same area (having multiple pixels) of two images $202_i$, $202_{i-1}$. A vector map may be determined for each of the regions R0, R1, R2 according to the level of precision of each region R0, R1, R2. For example, a first vector map may be obtained for a first area of the given image $202_i$. In this example, the first area corresponds to the entire area of the given image $202_i$. Alternatively, the first area may correspond to a selected area of the given image $202_i$. The first vector map is obtained for a first level of precision (e.g., a low level of precision). Then, the first area may be divided into at least one second area to obtain at least one second vector map at a second level of precision. In this example, the second level of precision is higher than the first level of precision and the second vector map has a higher level of precision than the first vector map. Then, the second area may be divided into at least one third area to obtain at least one third vector map at a third level of precision that is higher than both the first and second levels of precision. This process may be repeated any suitable number of times to obtain vector maps at the precision level needed to detect objects in each of the regions R0, R1, R2. By way of a specific and non-limiting example, the image $202_i$ may have an image resolution of 640 by 480 pixels and may be down sampled to create region R0 with 320 by 20 pixels at half the image resolution, region R1 with 160 by 50 pixels at a quarter of the image resolution and regions R2 with 80 by 30 pixels at one eighth of the image resolution. A motion vector may be obtained for each pixel, which results in 6,400 motion vectors for region R0, 8,000 motion vectors for region R1 and 2,400 motion vectors for region R2, for a total of 16,800 motion vectors. In contrast to calculating a motion vector for each pixel of the original image $202_i$, which would result in 307,200 motion vectors, the approach described herein may reduce the computational complexity of the image processing algorithm. While the number of regions and areas in the above examples is three (3), the number of regions and/or areas used in practical applications may be more or less than three (3). The system 100 may implement any other suitable video content analysis algorithm or application based on the approaches described herein.

Figure 4:
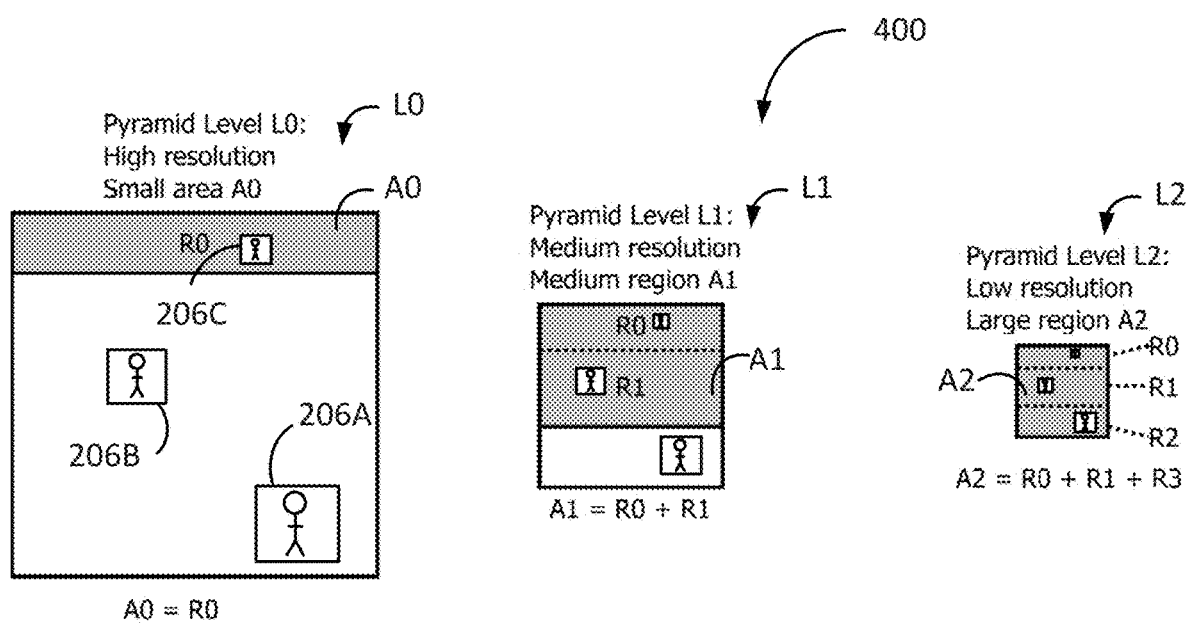
FIG. 4 is a diagram of an image pyramid of the image of FIG. 3, in accordance with one or more embodiments.

With reference to FIG. 4, the system 100 may obtain a representation 400 of the given image $202_i$ based on the scene information and perform a plurality of processing steps on the representation 400. The plurality of processing steps may be iterative processing steps. Each iteration may comprises processing a selected area A0, A1, A2 of the representation according to a selected level of precision. Each iteration may comprises reducing the selected area A0, A1, A2 of the representation 400 for processing and increasing the level of precision for processing of the selected area A0, A1, A2 until the level of precision of each region R0, R1, R2 is obtained for the given image $202_i$. An object and/or motion of an object may then be detected based on the representation 400 after being processed. For example, the representation 400 may be iteratively processed to generate a vector map for each of the regions R0, R1, R2, and an object and/or motion of an object may be detect from the vector maps. Similarly, the areas A0, A1, A2 of the representation 400 may be processed in parallel to obtain the level of precision of each region R0, R1, R2 and to generate the corresponding vector maps.

In some embodiments, as illustrated in FIG. 4, the representation 400 is an image pyramid. In general, an image pyramid is a multi-scale hierarchical representation of an image. The image pyramid 400 may be a Gaussian pyramid, a Laplacian pyramid, a Steerable pyramid or any other suitable image pyramid. In some embodiments, the image pyramid 400 is based on the image pyramids of the feature pyramid network described in Lin, Tsung-Yi, et al., "Feature pyramid networks for object detection," Proceedings of the IEEE Conference on Computer Vision and Pattern Recognition, 2017, the contents of which are hereby incorporated by reference. The image pyramid 400 may be generated based on any suitable image processing techniques, as known or unknown to the skilled person. The image pyramid 400 comprises a plurality of pyramid levels L0, L1, L2. Each level L0, L1, L2 of the image pyramid 400 may represent the given image $202_i$ at different resolutions. The image pyramid 400 may be generated by down sampling the given image $202_i$ to obtain the pyramid levels L0, L1, L2. That is, the given image $202_i$ has an original resolution and the given image $202_i$ may be down sampled to produce pyramid levels L0, L1, L2 each having a lower resolution than the given image $202_i$. In this example, the pyramid level L0 does not have the same resolution as the given image $202_i$; however, in some embodiments, one of the pyramid levels (e.g., the pyramid level L0) may have the same resolution as the given image $202_i$ (i.e., it is not down sampled). Accordingly, each level L0, L1, L2 has associated therewith a resolution (which may also be referred to as a "scale"). Each level L0, L1, L2 may have associated therewith a selected area A0, A1, A2. The selected area A0, A1, A2 corresponds to the area of the image pyramid 400 for a given level L0, L1, L2 that is processed by the image processing algorithm. The resolution associated with each level L0, L1, L2 may indicate the level of precision of the processing of the selected area A0, A1, A2 by the image processing algorithm. In the illustrative embodiment of FIG. 4, relative to each other, level L0 has a high resolution and a small selected area A0, level L1 has a medium resolution and a medium selected area A1, and the level L2 has a low resolution and a large selected area A2. Furthermore, in this example, the selected area A2 of pyramid level L2 corresponds to regions R0, R1 and R2, the selected area A1 of pyramid of level L1 corresponds to regions R0 and R1, and the selected area A0 of pyramid of level L0 corresponds to the region RD. In some embodiments, each level L0, L1, L2 only contains the corresponding selected area A0, A1, A2 of the image $202_i$ at the corresponding scale and the other areas of the image $202_i$ are omitted from each level of the image pyramid 400. The image pyramid 400 may vary depending on practical implementations.

In some embodiments, the system 100 processes the image pyramid 400 based on the order of the levels L0, L1, L2, for example, such as by processing from the pyramid level L2 having the lowest resolution to the pyramid level L0 having the highest resolution. Accordingly, image pyramid 400 may be processed according to the lowest to highest level of precision required of the regions R0, R1 and R2. For example, a first iteration may process a selected area A2 corresponding to regions RD, R1 and R2, a second iteration may process a selected area A1 corresponding to regions RD and R1, a third iteration may process a selected area A0 corresponding to region RD. While three (3) levels L0, L1, L2 are illustrated in FIG. 4, this is for example purposes only and the number of levels and/or the number of iterations may be more or less than three (3) depending on practical implementations. Similarly, while three (3) selected area A0, A1, A2 are illustrated in FIG. 4, this is for example purposes only and the number of selected areas may be more or less than three (3) depending on scene information and practical implementations. In some embodiments, the system 100 processes the image pyramid 400 by processing the levels L0, L1, L2 in order of highest resolution to lowest resolution. In some embodiments, the system 100 processes the image pyramid 400 by processing a select number of levels (e.g., levels 2 to 4 of an image pyramid having 0 to 5 levels). It should be appreciated that by iteratively processing the representation 400 of a given image $202_i$, where each subsequent iteration reduces a selected area of the representation 400 for processing and increases the level of precision of the processing of the selected area, that the computationally complexity of video content analysis may be reduced.

Figure 5A:
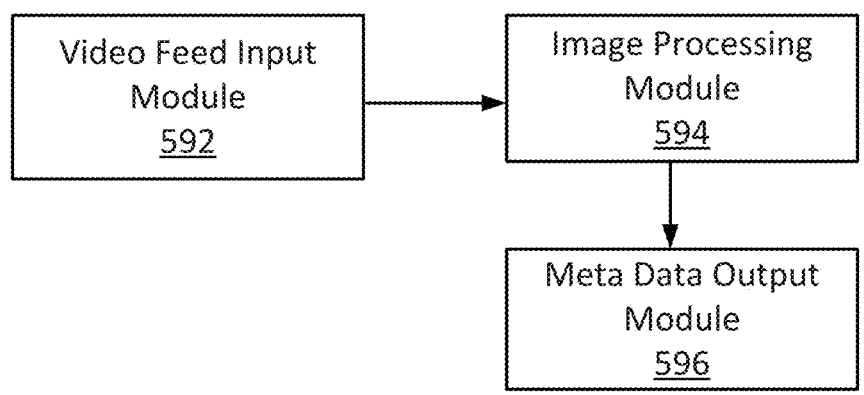
FIG. 5A is a schematic diagram of a video content analysis system, in accordance with one or more embodiments.

With reference to FIG. 5A, a specific and non-limiting example of implementation of the system 100 is illustrated. In this example, the system 100 is for processing the image $202_i$ differently according to the different levels of precision required for the image $202_i$. A video feed input module 592 receives the video feed 200 and provides the video feed 200 or at least one image $202_i$ of the video feed 200 to an image processing module 594. The image processing module 594 processes at least one image $202_i$ of the video feed 200. The image processing module 594 generates meta data indicative of the content of the video feed 200. A meta data output module 596 outputs the meta data generated by the image processing module 594.

Figure 5B:
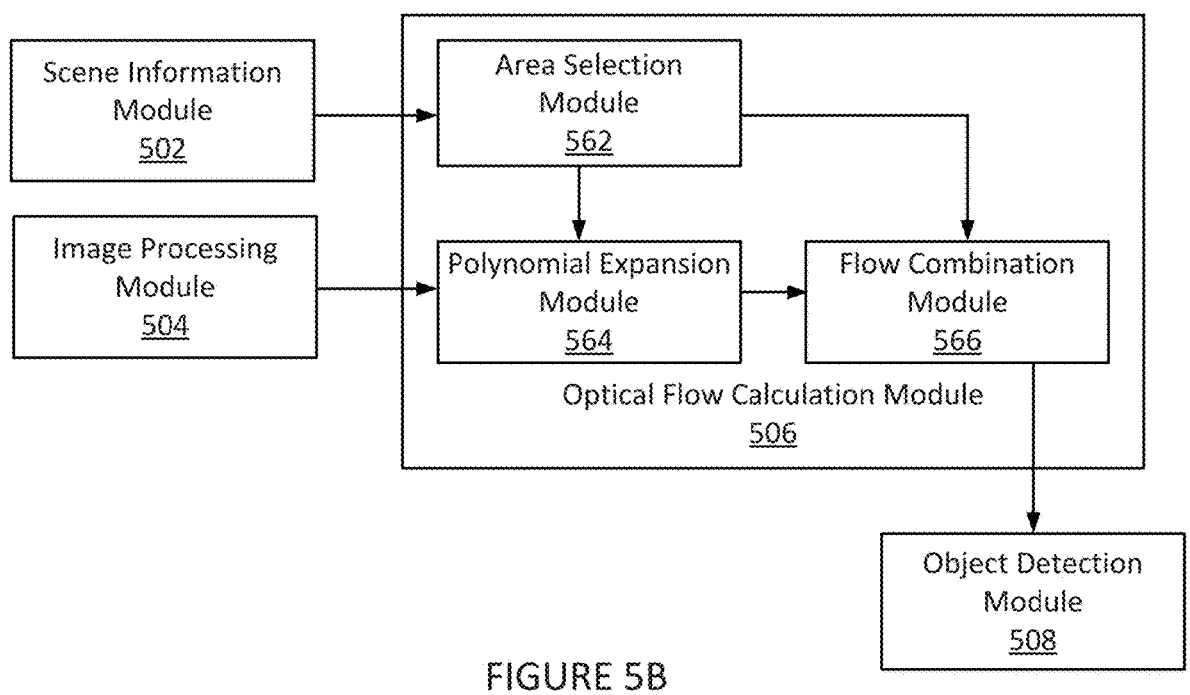
FIG. 5B is a schematic diagram of a video content analysis system for performing optical flow detection, in accordance with one or more embodiments.

With reference to FIG. 5B, a specific and non-limiting example of implementation of the system 100 is illustrated. In this example, the system 100 is for implementing an optical flow algorithm that is used for detecting objects in the video feed 200. A scene information module 502 provides scene information to an optical flow calculation module 506. An image processing module 504 provides a representations 400 of each image $202_i$ to the optical flow calculation module 506. The optical flow calculation module 506 performs optical flow calculations and determines one or more vector maps comprising a plurality of motion vectors for each image $202_i$. An object detection module 508 detects an object and/or motion of an object in the video feed 200 from the vector maps.

Figure 6:
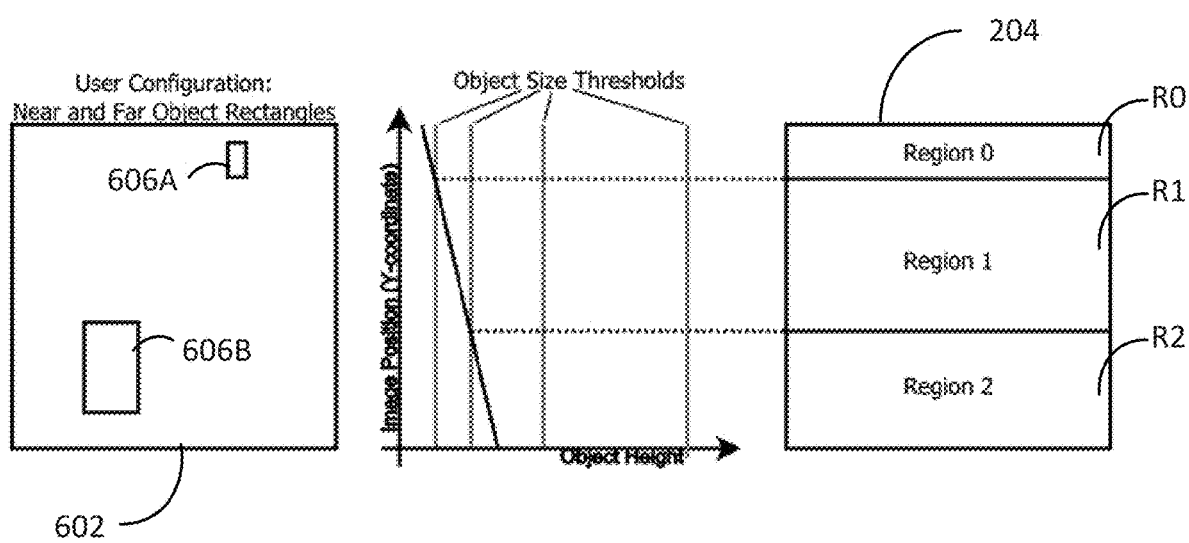
FIG. 6 is a diagram of an image and scene information to illustrate an example for determining regions in image space, in accordance with one or more embodiments.

The scene information module 502 may obtain the scene information in any suitable manner. With additional reference to FIG. 6, an example illustrates how the scene information may be processed. The scene information may be an object-size distribution in the image space 204. The object-size distribution may be indicative of the sizes of objects expected in each region of the image space 204. The object-size distribution may be generated based on a user selecting object sizes of a given object 606A, 606B in an image 602. The system 100 may take the given object 606A, 606B at two object sizes in the image 602 and interpolate the object sizes for the whole image space 204 to generate the object-size distribution. For example, when the camera 102 is static and positioned to have the horizon of the scene space 104 parallel to the x-axis of the image space 204, the object-size distribution linearly depends on the y-coordinate of the image space 204. Accordingly, the scene information may indicate various regions R0, R1, R2 of the image space 204 and a level of precision associated with each region R0, R1, R2. When the camera 102 is static, the scene information may be static. Similarly, when the camera 102 is moving, the scene information may change based on the position of the camera 102.

In some embodiments, object size thresholds are chosen based on the video content analysis application or algorithm. For example, in the case of optical flow, for each range of object sizes a certain level of precision may be desired and the object size thresholds are set according to the desired level of precision for the different object sizes. In the case the representation 400 is a Gaussian image pyramid with a scaling factor of 0.5, the pyramid level for different areas of the representation 400 may be determined by multiplying the object size thresholds by powers of two (2). By way of example, an upper limit on a resolution of an object is selected, such as 20 pixels in height for a person. The upper limit would vary depending on the types of objects that are being detected and on practical implementations. Then, powers of two (2) multiplied by that limit may be used to determine the object size thresholds. For example: $20 \times 2^0 = 20$; $20 \times 2^1 = 40$; $20 \times 2^2 = 80$; $20 \times 2^3 = 160$; $20 \times 2^4 = 320$.

Assuming the video feed 200 has a resolution of 640 by 480 pixels, the object height distribution may be set as function of $h(y) = 160 - y \times 0.25$. Based on this distribution, the position for y for which there is a certain height h(y) can be determined by reformulating the aforementioned function as $y(h) = 640 - 4 \times h$. From the aforementioned thresholds, the y positions as region limits in order to achieve the 20 pixel height limit can be calculated as: y=560 for $20 \times 2^0 = 20$; y=480 for $20 \times 2^1 = 40$; y=320 for $20 \times 2^2 = 80$; y=0 for $20 \times 2^3 = 160$; y=-640 for $20 \times 2^4 = 320$. The area between y=560 and 480 and the area between 0 and -640 can be discarded as they are outside of the range of the video feed 200. Region R0 is between y=480 to 320 and region R1 is between y=320 to 0. In this example, the values are for the full image resolution, which is also the resolution for pyramid level L0. Accordingly, object heights and region limits at the pyramid level L1 are half of the ones specified at the pyramid level L0, object heights and region limits at the pyramid level L2 are a quarter of the ones specified at the pyramid level L0, and so on. Thus, is this example, region R0 has a resolution of 640 by 160 pixels at level L0 and a resolution of 320 by 80 pixel at level L1, and region R1 has a resolution of 640 by 320 pixels at level L0 and a resolution of 160 by 80 pixels at level L2.

Referring back to FIG. 5B, the scene information provided by the scene information module 502 may vary depending on practical implementations. The scene information may be provided manually or may be determined algorithmically. The system 100 may learn where more precision is required. For example, the algorithm may be applied imprecisely in all areas of the image $202_i$ and then increase precision in regions where little or no movement is detected. Then, the algorithm may determine if this increase in precision results in increased motion detection. If this results in increased motion detection, then this level of precession may be applied to this region. If this does not result in increased motion detection, this process is repeated until motion is detect or the maximum precision level is reached. If there is no motion detected at the maximum precision level, then this region may be set as a no-motion region. In some embodiments, the scene information module 502 may simply store the scene information. In some embodiments, the scene information is a one-time input when the camera 102 is enrolled into the system.

The image processing module 504 obtains the representation 400 for the image $202_i$ and provides the representation 400 to optical flow calculation module 506. The image processing module 504 may process the image $202_i$ to generate the representation 400 (e.g., an image pyramid). The optical flow calculation module 506 determines vector maps based on the representation 400 from the image processing module 504 and the scene information from the scene information module 502.

In some embodiments, as illustrated in FIG. 5B, the optical flow calculation module 506 comprises an area selection module 562, a polynomial expansion module 564 and a flow combination module 566. The area selection module 562 identifies the selected area A0, A1, A2 of the representation 400 for the optical flow calculation to be performed thereon and the corresponding level of precision for the selected area A0, A1, A2. Identifying the selected area A0, A1, A2 of the representation 400 may comprise identifying which ones of the regions R0, R1, R2 of the image $202_i$ should be processed and the corresponding levels of precision associated with each region R0, R1, R2. Determining the levels of precision for the selected area A0, A1, A2 may comprise selecting a pyramid level L0, L1, L2. The area selection module 562 provides the selected area A0, A1, A2 of the representation 400 and the corresponding level of precision to the polynomial expansion module 564.

The polynomial expansion module 564 determines polynomial expansion coefficients based on the representation 400, the selected area A0, A1 A2 of the representation 400 and the corresponding level of precision. The polynomial expansion module 564 performs a series of polynomial expansions of pixels in representation 400 for the selected area A0, A1, A2 at the corresponding level of precision to generate the polynomial expansion coefficients. The polynomial expansion coefficients may be determined based on the polynomial expansion technique described in Gunnar Farnebäck, "Two-Frame Motion Estimation Based on Polynomial Expansion", Scandinavian Conference on Image Analysis, 2013, (hereinafter "Farnebäck") the contents of which are hereby incorporated by reference. The polynomial expansion coefficients determined herein differs from the technique described in the Farnebäck. In particular, the polynomial expansion coefficients determined herein may be determined based on iteratively decreasing the selected area that the calculation are performed thereon, while increasing with each iteration the level of precision of the selected area.

The flow combination module 566 generates a vector maps for the image $202_i$ based on the polynomial expansion coefficients determined by the polynomial expansion module 564 and the selected areas A0, A1, A2 determined by the selection module 562 for the current image $202_i$ as well as for the previous image $202_{i-1}$. The vector maps of the selected area (e.g., area A2) corresponds to optical flow in that selected area. The vector maps may be determined based on the technique described in the Farnebäck. The optical flow calculation module 506 iteratively processes the representation 400 until the level of precision for each region R0, R1, R2 is obtained. That is, the described functionality of each of the area selection module 562, the polynomial expansion module 564 and the flow combination module 566 may occur at each iteration. For instance, the flow combination module 566 may combine any previous flow estimates from a previous frame that has been processed and/or from a previous iteration (e.g., a lower precision estimate) together with the polynomial expansion coefficients of an area into an updated vector map for that area. Once all iterations have been performed for a frame, the output of the flow combination module 566 may be a vector map for each area A0, A1, A2 and from which a vector map may be extracted for each of the regions R0, R1, R2. The flow combination module 566 provides the vector maps to the object detection module 508, which detects an object and/or motion of an object from the vector maps.

The optical flow calculation module 506 may vary depending on practical implementations. The functionality of one or more of the area selection module 562, the polynomial expansion module 564 and the flow combination module 566 may be combined into a single module and/or separated into multiple modules. The scene information module 502 may be combined with the optical flow module 506 and/or the area selection module 562. The image processing module 504 may be combined with the optical flow calculation module 506. Other combinations of the modules may be possible. One or more of the modules of FIG. 5B may be omitted depending on practical implementations.

Figure 7:
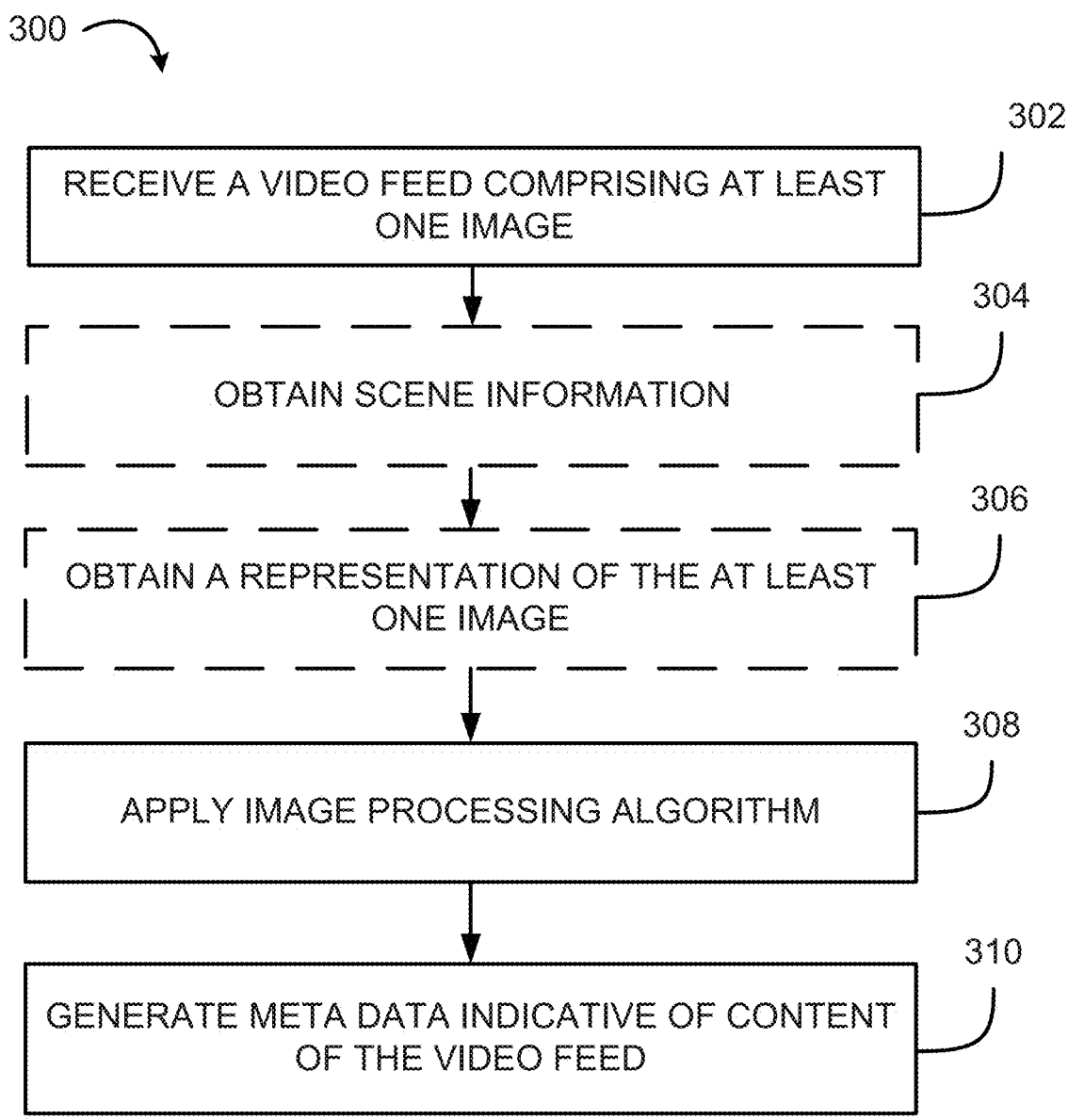
FIG. 7 is a flowchart illustrating an example method for video content analysis, in accordance with one or more embodiments.

With reference to FIG. 7, there is shown a flowchart illustrating an example method 300 for video content analysis. The method 300 may be implemented by the system 100.

At step 302, a video feed 200 is received. The video feed 200 comprises at least one image $202_i$ captured by a camera 102. The video feed 200 may be received in real-time, or near real-time, from the camera 102. The video feed 200 may be received from a database or storage device storing the video feed captured by the camera 102. The image $202_i$ has a plurality of regions R0, R1, R2 associated therewith and each region R0, R1, R2 is associated with a different level of precision required for each region R0, R1, R2. The received image $202_i$ may at the time of receipt be associated with each region R0, R1, R2 and the different level of precision required for each region R0, R1, R2 or may be associated with the each region R0, R1, R2 and the different level of precision required for each region R0, R1, R2 at a later step of the method 300.

In some embodiments, at step 304, scene information of the image space 204 of the image $202_i$ is obtained. The scene information may be used to determine the regions R0, R1, R2 for processing of the image $202_i$ and the different levels of precision required for each region R0, R1, R2. The scene information may be used to associate the regions R0, R1, R2 and the different levels of precision for each regions R0, R1, R2 with the image $202_i$. The scene information may be obtained each time the method 300 is executed to process an image of the video feed 200 or may be obtain at the time of processing a first image of the video feed 200 and subsequent images are processed based on the same scene information. The scene information may be user-defined or may be determined algorithmically. Scene information may be obtained at any suitable time. The scene information may be re-definable (e.g., if the camera is moved or if the camera is a moving camera). The scene information may be set at the time of installation or enrolment of the camera 102 into the system 100. The scene information may be an object-size distribution indicative of sizes of objects expected in each region R0, R1, R2 of the image space 204. The scene information may be obtained from a look-up table, database or storage device storing predetermined scene information. In some embodiments, the scene information is generated during the execution of the method 300. A machine learning algorithm may processes one or more vector maps determined from the video feed 200 to generate the scene information. Alternatively to obtaining the scene information, information may be obtained and subsequently used in method 300 in place of the "scene information", where the information obtained is indicative of the level of precision required for each of the regions R0, R1, R2. This information may be obtained by a user inputting the levels of precision for each of the regions R0, R1, R2.

In some embodiments, at step 306, a representation 400 of the image $202_i$ of the video feed 200 is obtained. In some embodiments, the representation 400 is an image pyramid having a plurality of pyramid levels. Accordingly, step 306 may comprises generating an image pyramid based on the image $202_i$. In some embodiments, the representation 400 is the image $202_i$ having the regions R0, R1, R2 associated therewith. Accordingly, step 306 may comprises associating the regions R0, R1, R2 of the image space 204 with the image $202_i$. Associating the regions R0, R1, R2 with the image $202_i$ may correspond to knowing or identifying that the image $202_i$ is to be processed based on the regions R0, R1, R2. Alternatively to obtaining the representation 400, in some embodiments, the image $202_i$ may be directly used in the proceeding step(s) of the method 300 in place of the representation 400.

At step 308, an image processing algorithm is applied to each region R0, R1, R2 of the image $202_i$ to obtain for each region R0, R1, R2 the different level of precision. The image processing algorithm may be an adjustable image processing algorithm that is adjusted based on the different level of precision associated with each region R0, R1, R2. The adjustable image processing algorithm may generate one or more vector maps. For example, a vector map may be generated for each region R0, R1, R2 of the image $202_i$.

In some embodiments, at step 308, applying the adjustable image processing algorithm comprises iteratively repeating the image processing algorithm until the different level of precision for each region R0, R1, R2 is obtained. Each iteration of the image processing algorithm may be adjusted based on the different level of precision associated with each region R0, R1, R2.

In some embodiments, at step 308, applying the adjustable image processing algorithm comprises performing a plurality of processing steps on the representation 400 to obtain for each region R0, R1, R2 the different level of precision associated with each region R0, R1, R2, The representation 400 may be processed based on the scene information, as the scene information may indicate the regions R0, R1, R2 to process and the required level of precision of each region R0, R1, R2. The representation 400 may be iteratively processed, and each iteration may comprise processing a selected area A0, A1, A2 of the representation 400 to a selected level of precision. The selected area A0, A1, A2 for processing may be iteratively reduced and the selected level of precision for processing the selected area A0, A1, A2 may be iteratively increased until the level of precision for each region R0, R1, R2 of the image $202_i$ is obtained. For example, each iteration subsequent to a first iteration may comprises reducing the selected area A0, A1, A2 and increasing the selected level of precision until the level of precision for each region R0, R1, R2 is obtained. In some embodiments, each iteration comprises selecting a pyramid level that is indicative of the selected level of precision for processing the selected area A0, A1, A2 thereto. In some embodiments, the selected area A0, A1, A2 corresponds to one or more of the regions R0, R1, R2 based on the selected pyramid level. For example, as shown in FIG. 4, if the selected pyramid level is L1, then the selected area A1 corresponds to regions R0 and R1. In some embodiments, step 308 comprises iteratively processing the representation 400 to determine one or more vector maps comprising a plurality of motion vectors. A vector map may be determined for each of the regions R0, R1 R2 according to the level of precision of each region R0, R1, R2. The iterative processing may be stopped when the level of precision for each of the regions R0, R1, R2 is obtained. Each iteration of the iterative processing may comprise determining a vector map for each of the selected areas A0, A1, A2 and then vector maps for each of the regions R0, R1, R2 may be extracted after the iterative processing is complete.

At step 310, the image processing algorithm generates meta data indicative of the content of the video feed 200. The meta data may correspond to information derived from one or more vector maps determined at step 308. In some embodiments, at step 310, an object in the video feed 202 is detected from the one or more vector maps. For instance, the vector map(s) may comprise one or more motion vectors that indicate motion at a given pixel or in an area comprising a plurality of pixels. The motion vectors may thereby be processed to accordingly detect an object. Detecting an object may comprise detecting where in the image space 204 (or to the image $202_i$) the object is. For instance, the motion vectors that indicate an object may be mapped to the image space 204 (or to the image $202_i$) to indicate where in the image space 204 (or the image $202_i$) the object is. Accordingly, detecting an object in the video feed 202 may comprises detecting motion of the object in the video feed 200. A given object may be present in more than one of the regions R0, R1, R2 and vector maps in multiple regions may indicate that an object in multiple regions is present. For example, if one or more motion vectors of a first regions and one or more motion vectors of a second regions adjacent to the first region indicate motion, this may be used to indicate a single moving object. The detection of the object in the video feed 202 may be based on any suitable object detection techniques, as known or unknown to the skilled person. The meta data may indicate the detected object and/or the detected motion of the object in the video feed 200 and may be determined from processing the vector map(s). The meta data may be information regarding objects detected, or motion detected, or the results of any other analytics. The meta data may be provided by tagging the video feed 200 with meta data in areas of the video feed 200. The meta data may be provided by way of a log file logging the detected meta data. The meta data may be stored in on or more databases and/or storage devices. The meta data may be outputted in any suitable manner. The meta data may be transmitted to another electronic device. The meta data may be outputted as visual information to a display device (e.g., to help a user interpret the video feed 200). The outputted visual information may comprise at least one image of the video feed 200 being displayed on the display device with at least one visual indicator (e.g., superimposed on the image) to indicate that at least one object or motion of at least one object has been detected. The display device may be any suitable display device, for example, such as a cathode ray tube display screen, a light-emitting diode display screen, a liquid crystal display screen, a plasma display, a touch screen, or any other suitable display device.

Figure 8:
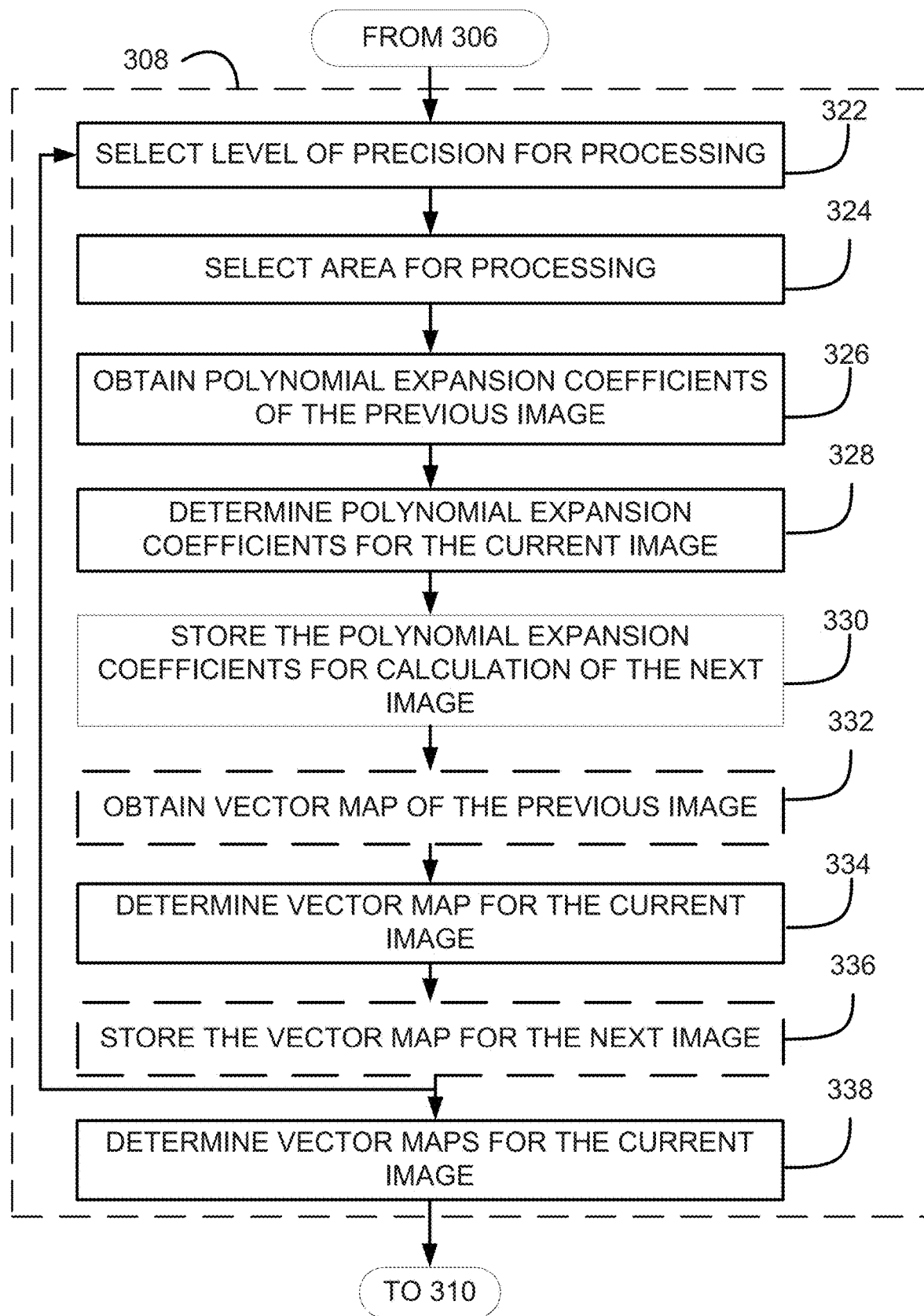
FIG. 8 is a flowchart illustrating the step of applying an adjustable image processing algorithm of the method of FIG. 7, in accordance with one or more embodiments.

The method 300 may be used for any suitable video content analysis application. In some embodiments, the method 300 may be for optical flow detection. With additional reference to FIG. 8, there is shown a flowchart illustrating an example of step 308 of applying an adjustable image processing algorithm, in accordance with some embodiments. For the purposes of discussing the method 300 in relation to FIG. 8, the image $202_i$ is referred to as the "current image". At step 322, a level of precision for the processing of the representation 400 of the current image $202_i$ is selected (hereinafter the "selected level of precision"). The selected level of precision may be increased with each subsequent iteration of step 322. The selected level of precision may be set according to a pyramid level L0, L1, L2 that indicates the selected level of precision for processing of that pyramid level L0, L1, L2. Accordingly, a pyramid level L0, L1, L2 may be selected at each iteration of step 322.

At step 324, an area A0, A1, A2 for processing the representation 400 of the current image $202_i$ is selected (hereinafter the "selected area"). The selected area A0, A1, A2 may be decreased with each subsequent iteration of 324. The selected area A0, A1, A2 may be determined by selecting one or more of the regions R0, R1, R2 based on the selected pyramid level L0, L1, L2. On a first iteration of step 324, the selected area A2 may correspond to all of the regions R0, R1 R2 and each subsequent iteration of step 324 may comprise removing one of the regions R0, R1, R2 from the selected area (e.g., as illustrated in FIG. 4).

At step 326, polynomial expansion coefficients of a previous image $202_{i-1}$ of the video feed 200 is obtained. The polynomial expansion coefficients of the previous image $202_{i-1}$ may be determined according to step 328 (discussed elsewhere in this document). The polynomial expansion coefficients obtained at step 326 correspond to the polynomial expansion coefficients for the previous image $202_{i-1}$ as determined for the same selected area and same level of precision as the current iteration. The polynomial expansion coefficients of the previous image $202_{i-1}$ may be obtained from a computer memory, database or the like having stored therein the polynomial expansion coefficients.

At step 328, polynomial expansion coefficients for the current image $202_i$ are obtained. The polynomial expansion coefficients are obtained for the selected area A0, A1, A2 at the selected level of precision. More specifically, the polynomial expansion coefficients may be generated by performing a polynomial expansion of the representation 400 (e.g., image pyramid) for the selected area A0, A1, A2 at the selected level of precision (e.g., selected pyramid level). The polynomial expansion coefficients are obtained as the motion in the current image $202_i$ may be approximated by polynomial equations according to the polynomial expansion coefficients of the current image $202_i$ and the previous image $202_{i-1}$. The polynomial expansion coefficients may be determined based on the technique described in Farnebäck. The polynomial equation from Farnebäck is a kind of representation of image data, which may be useful in order to calculate a shift (or optical flow) between two polynomial equations. The polynomial expansion coefficients may be parameters to the equation from Farnebäck and the set of parameters may be calculated for every pixel.

At step 330, the polynomial expansion coefficients determined at step 328 are stored in a computer memory, database or the like. The polynomial expansion coefficients of the current image $202_i$ are stored as they are used in the processing of a next image $202_{i+1}$ of the video feed 200.

In some embodiments, at step 332, a vector map of the previous image $202_{i-1}$ of the video feed 200 is obtained. The vector map of the previous image $202_{i-1}$ may be determined according to step 334 (discussed elsewhere in this document). The vector map obtained at step 332 corresponds to the vector map for the previous image $202_{i-1}$ as determined for the same selected area and same level of precision as the current iteration. The vector map of the previous image $202_{i-1}$ may be obtained from a computer memory, database or the like having stored therein the vector map.

At step 334, a vector map for the current image $202_i$ is determined. The vector map is determined for the selected area at the corresponding level of precision. The vector map is indicative of optical flows in the selected area of the current image $202_i$. The vector map is determined based on a first set of polynomial expansion coefficients of the current image $202_i$ as determined at step 328 and a second set of polynomial expansion coefficients of the previous image $202_{i-1}$ obtained at step 326. It may be appropriate to use the polynomial expansion coefficients of the previous image $202_{i-1}$ to calculate the vector map when the level of precision and/or the object size distribution does not change between the current and previous image $202_i$, $202_{i-1}$. In some embodiments, the vector map is determined based on the vector map of the previous image $202_{i-1}$ obtained at step 332. It may be appropriate to use the vector map of the previous image $202_{i-1}$ when motion directions do not change suddenly between the two images $202_i$, $202_{i-1}$. In some embodiments, the vector map is determined based on the vector map of the previous iteration of step 334. In some embodiments, the vector map is determined based on a first set of polynomial expansion coefficients of the current image $202_i$ and the second set of polynomial expansion coefficients of the previous image $202_{i-1}$. In some embodiments, the motion vector of the current image $202_i$ is determined based on the upscaled motion vector of the previous iteration.

In some embodiment, at step 336, the vector map determined at step 334 is stored in a computer memory, database or the like. The vector map of the current image $202_i$ is stored as it may be used in the processing of the next image $202_{i+1}$ of the video feed 200. The vector map stored at step 336 may comprise the upscaled vector map determined at step 332.

After step 334 (or step 336), the method 300 may return to step 322 to select the level of precision for processing the representation 400 for the next iteration. This process may be repeated until the desired level of precision for each region R0, R1, R2 of the current image $202_i$ is obtained and each region R0, R1, R2 has a vector map associated therewith at the required level of precision. At step 338, one or more vector maps for the current image $202_i$ is determined by combining the vector map(s) determined at step 334 for the different regions R0, R1, R2. Moving objects may then be detected at step 310 (of FIG. 7) from the vector map(s) generated at step 338.

Figure 9:
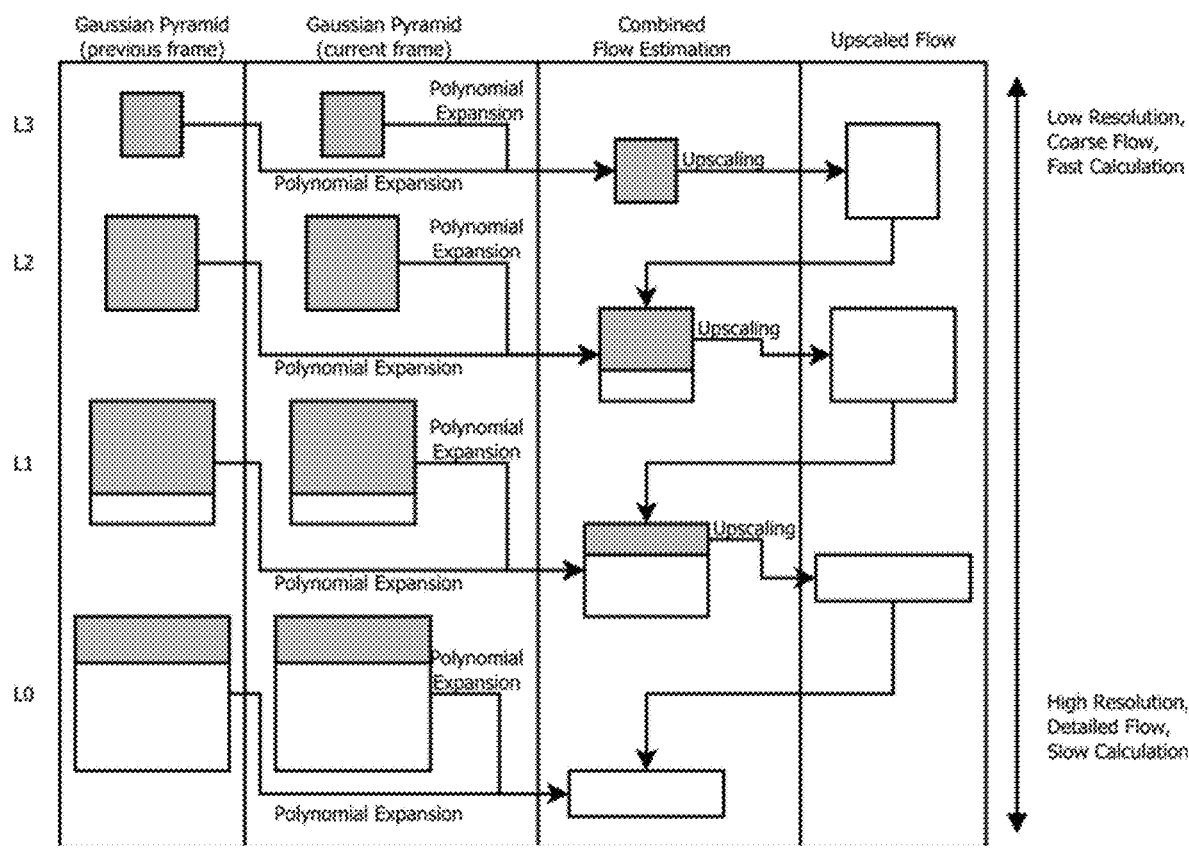
FIG. 9 is a diagram illustrating iterative processing of an image pyramid for generating optical flows, in accordance with one or more embodiments.

With additional reference to FIG. 9, a specific and non-limiting example illustrates the iterative processing of image pyramids for generating optical flows. As illustrated, at each iteration, a pyramid level L3, L2, L1, L1 is selected. In this example, the pyramid level L3 is first selected followed by selecting in order pyramid levels L2, L1 and L0. A Gaussian image pyramid of the previous image $202_{i-1}$ and the current image $202_i$ is obtained. A first set of polynomial expansion coefficients are obtained for the selected pyramid level for the Gaussian image pyramid of the current image $202_i$ and second set of polynomial expansion coefficients are obtained for the selected pyramid level for the Gaussian image pyramid of the previous image $202_{i-1}$. The first and second set of polynomial expansion coefficients are combined to generate a vector map for the current image $202_i$ corresponding to the optical flow in the selected area. The vector map is upscaled to the resolution of pyramid level of the next iteration. Subsequent to the first iteration, the vector map is generated based on the first and second set of polynomial expansion coefficients and the upscaled vector map of the previous iteration, Once the vector maps are obtained for all of the regions of interest, the vector maps are combined into one or more vector maps used for object detection.

The number of iterations that the method 300 and/or system 100 performs may vary depending on the scene information. Furthermore, the idea of limiting the number of iterations based on scene information may be applied to any suitable image processing method that uses iterative refinement on increasing levels of precision. In some embodiments, existing optical flow algorithms may be modified to function based on the scene information. For example, any of the following optical flow algorithms may be used: Lucas, Bruce D. and Kanade, Takeo, "An Iterative Image Registration Technique with an Application to Stereo Vision," Proceedings of Imaging Understanding Workshop, 1981, and/or Tao, Michael W. et al., "SimpleFlow: A Non-iterative, Sublinear Optical Flow Algorithm," Computer Graphics Forum 31, 2012, the contents of which are hereby incorporated by reference.

In some embodiments, before determining the next pyramid level, a selected area of a given image may be chosen at the current pyramid level for which coarser details and higher pyramid levels are desired, and the next level of the pyramid may be generated based on the current pyramid level and a corresponding area that decreases in size as the level of precision decreases. For instance, the levels L0, L1, L2 of the image pyramid may be processed in order of highest to lowest level of precision. Accordingly, each iteration at step 308 of method 300 may comprises processing a selected area A0, A1, A2 of the representation 400 in order of highest to lowest level of precision until the level of precision for each region R0, R1, R2 of the image $202_i$ is obtained.

In some embodiments, the processing is done separately on separate levels of the image pyramid with respect to each level's selected area, without reusing information from the processing of other levels. This may be applicable when object detection methods are based on sliding windows, deep neural networks with fully-convolutional architecture, and/or to image filtering methods where knowledge of object sizes guides a filter size.

In some embodiments, the method may be applied to a feature pyramid network, where the feature pyramid network has successively smaller regions of interest on which a deep neural networks object detector with fully-convolutional architecture is applied.

In some embodiments, not every image of the images 202 is processed. Based on the scene information, a certain number of images of the video feed 200 may be omitted from the processing. For example, based on the scene information, a certain number of images may be omitted from the processing of certain selected areas and/or pyramid levels.

Figure 10:
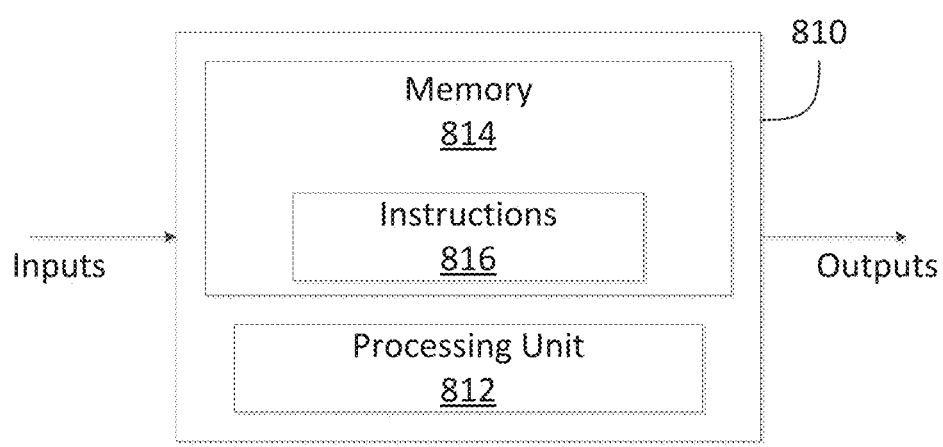
FIG. 10 is a schematic diagram of an example computing system for implementing the system of FIG. 1 and/or the method of FIG. 7, in accordance with one or more embodiments.

With reference to FIG. 10, the system 100 and/or the method 300 may be implemented by a computing device 810, comprising a processing unit 812 and a memory 814 which has stored therein computer-executable instructions 816. The processing unit 812 may comprise any suitable devices configured to implement the system 100 such that instructions 816, when executed by the computing device 810 or other programmable apparatus, may cause the functions/acts/steps of the method 300 as described herein to be executed. The processing unit 812 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof.

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 914 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 914 may comprise any storage means (e.g., devices) suitable for retrievably storing machine-readable instructions 816 executable by processing unit 812.

The methods and systems for detecting an object in a video feed described herein may be implemented in a high level procedural or object oriented programming or scripting language, or a combination thereof, to communicate with or assist in the operation of a computer system, for example the computing device 810. Alternatively, the methods and systems for detecting an object in a video feed may be implemented in assembly or machine language. The language may be a compiled or interpreted language. Program code for implementing the methods and systems for detecting an object in a video feed may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting an object in a video feed may also be considered to be implemented by way of a non-transitory computer-readable storage medium having a computer program stored thereon. The computer program may comprise computer-readable instructions which cause a computer, or in some embodiments the processing unit 812 of the computing device 810, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for detecting an object in a video feed may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A computer-implemented method for video content analysis, the method comprising:
   receiving a video feed comprising at least one image captured by a camera, the at least one image having a plurality of regions, each region of the plurality of regions associated with a different level of precision to be obtained by an adjustable image processing algorithm;
   applying the adjustable image processing algorithm to each region of the at least one image by performing a plurality of processing steps on the at least one image to obtain for each region the different level of precision, each processing step of the plurality of processing steps comprises processing a selected area of the at least one image corresponding to one or more of the regions, the adjustable image processing algorithm adjusting at least some of the plurality of processing steps by reducing the selected area for processing by removing at least one of the regions from the selected area and increasing a corresponding level of precision for processing; and generating, by the adjustable image processing algorithm, meta data indicative of content of the video feed.

2. The method of claim 1, wherein applying the adjustable image processing algorithm comprises iteratively repeating the adjustable image processing algorithm until the different level of precision for each region is obtained, each iteration being adjusted based on the different level of precision associated with each region.

3. The method of claim 1, further comprising obtaining a representation of the at least one image, and wherein applying the adjustable image processing algorithm comprises performing the plurality of processing steps on the representation to obtain for each region the different level of precision.

4. The method of claim 3, wherein the representation is an image pyramid having a plurality of pyramid levels and wherein adjusting each processing step comprises selecting a level of the image pyramid for processing.

5. The method of claim 1, wherein the different level of precision associated with each region depends on a corresponding distance of one or more objects in each region from the camera.

6. The method of claim 5, further comprises obtaining scene information indicative of the corresponding distance of one or more objects in each region from the camera and determining the regions and the different level of precision for each region based on the scene information.

7. The method of claim 1, wherein the adjustable image processing algorithm is an optical flow algorithm and the meta data comprises data indicative of detected motion of at least one object in the video feed.

8. The method of claim 1, further comprises generating, by the adjustable image processing algorithm, one or more vector maps for each one of the regions, and wherein the meta data is generated based on the vector maps.

9. The method of claim 8, wherein applying the adjustable image processing algorithm comprises iteratively processing a representation of the at least one image, where each iteration comprises:

reducing the selected area of the representation for processing and increasing the corresponding level of precision for processing the selected area, the selected area corresponding to one or more of the regions;

determining a first set of polynomial expansion coefficients of the representation based on the selected area;

obtaining a second set of polynomial expansion coefficients corresponding to a previous image of the video feed preceding the at least one image; and generating a vector map based on the first and second set of polynomial expansion coefficients.

10. The method of claim 9, wherein generating the vector map further comprises generating the vector map based on a previous vector map determined for the previous image for the selected area.

11. The method of claim 9, wherein generating the vector map further comprises generating an upscaled vector map based on the vector map generated based on the first and second set of polynomial expansion coefficients.

12. The method of claim 11, wherein generating the vector map further comprises generating the vector map based on the first and second set of polynomial expansion coefficients and the upscaled vector map from a previous iteration.

13. A system for video content analysis, the system comprising:

at least one processing unit; and a non-transitory computer-readable memory having stored thereon program instructions executable by the at least one processing unit for:

receiving a video feed comprising at least one image captured by a camera, the at least one image having a plurality of regions, each region of the plurality of regions associated with a different level of precision to be obtained by an adjustable image processing algorithm;

applying the adjustable image processing algorithm to each region of the at least one image by performing a plurality of processing steps on the at least one image to obtain for each region the different level of precision, each region each processing step of the plurality of processing steps comprises processing a selected area of the at least one image corresponding to one or more of the regions, the adjustable image processing algorithm adjusting at least some of the plurality of processing steps by reducing the selected area for processing by removing at least one of the regions from the selected area and increasing a corresponding level of precision for processing; and generating, by the adjustable image processing algorithm, meta data indicative of content of the video feed.

14. The system of claim 13, wherein applying the adjustable image processing algorithm comprises iteratively repeating the adjustable image processing algorithm until the different level of precision for each region is obtained, each iteration being adjusted based on the different level of precision associated with each region.

15. The system of claim 13, wherein the program instructions are further executable by the at least one processing unit for obtaining a representation of the at least one image, and wherein applying the adjustable image processing algorithm comprises performing a plurality of processing steps on the representation to obtain for each region the different level of precision.

16. The system of claim 15, wherein the representation is an image pyramid having a plurality of pyramid levels and wherein adjusting each processing step comprises selecting a level of the image pyramid for processing.

17. The system of claim 13, wherein the different level of precision associated with each region depends on a corresponding distance of one or more objects in each region from the camera.

18. The system of claim 17, wherein the program instructions are further executable by the at least one processing unit for obtaining scene information indicative of the corresponding distance of one or more objects in each region from the camera and determining the regions and the different level of precision for each region based on the scene information.

19. The system of claim 13, wherein the adjustable image processing algorithm is an optical flow algorithm and the meta data comprises data indicative of detected motion of at least one object in the video feed.

20. The system of claim 13, wherein the program instructions are further executable by the at least one processing unit for generating, by the adjustable image processing algorithm, one or more vector maps for each one of the regions, and wherein the meta data is generated based on the vector maps.

21. The system of claim 20, wherein applying the adjustable image processing algorithm comprises iteratively processing a representation of the at least one image, where each iteration comprises:
  reducing the selected area of the representation for processing and increasing the corresponding level of precision for processing the selected area, the selected area corresponding to one or more of the regions;
  determining a first set of polynomial expansion coefficients of the representation based on the selected area;
  obtaining a second set of polynomial expansion coefficients corresponding to a previous image of the video feed preceding the at least one image; and
  generating a vector map based on the first and second set of polynomial expansion coefficients.

22. The system of claim 21, wherein generating the vector map further comprises generating the vector map based on a previous vector map determined for the previous image for the selected area.

23. The system of claim 21, wherein generating the vector map further comprises generating an upscaled vector map based on the vector map generated based on the first and second set of polynomial expansion coefficients.

24. The system of claim 23, wherein generating the vector map further comprises generating the vector map based on the first and second set of polynomial expansion coefficients and the upscaled vector map from a previous iteration.

25. A non-transitory computer readable medium having stored thereon program code executable by a processor for video content analysis, the program code comprising instructions for:
  receiving a video feed comprising at least one image captured by a camera, the at least one image having a plurality of regions, each region of the plurality of regions associated with a different level of precision to be obtained by an adjustable image processing algorithm;
  applying the adjustable image processing algorithm to each region of the at least one image by performing a plurality of processing steps on the at least one image to obtain for each region the different level of precision, each processing step of the plurality of processing steps comprises processing a selected area of the at least one image corresponding to one or more of the regions, the adjustable image processing algorithm adjusting at least some of the plurality of processing steps by reducing the selected area for processing by removing at least one of the regions from the selected area and increasing a corresponding level of precision for processing; and
  generating, by the adjustable image processing algorithm, meta data indicative of content of the video feed.

* * * * *